Figure 1:
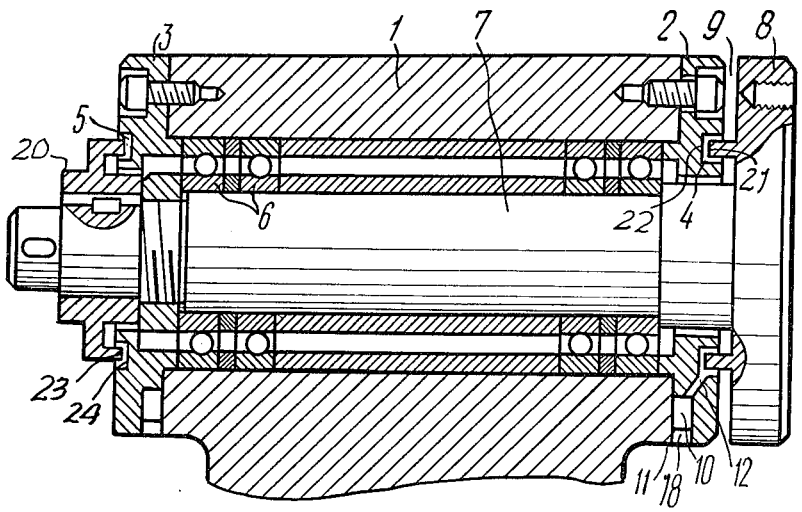

United States Patent [19]

Kopelev et al.

[11] 4,117,750

[45] Oct. 3, 1978

[54] SPINDLE ASSEMBLY FOR A PRECISION MACHINE TOOL

[76] Inventors: Fridrikh Lvovich Kopelev, ulitsa Komsomolskaya, 43, kv. 5; Valentin Vladimirovich Kossek, ulitsa Generala Petrova, 68, kv. 61; Askold Fedorovich Dubinenko, ulitsa Kosmonavtov, 13, kv. 8; Semen Markovich Sherstinsky, ulitsa Artema, 22, kv. 10, all of, Odessa, U.S.S.R.

[21] Appl. No.: 788,939

[22] Filed: Apr. 19, 1977

[51] Int. Cl.² .................... B23B 19/02; F16C 1/24
[52] U.S. Cl. ................................. 82/30; 308/187.1
[58] Field of Search ............... 82/30; 308/187, 187.1, 308/187.2, 36.4

[56] References Cited

U.S. PATENT DOCUMENTS

| | | | |
|---|---|---|---|
| 1,984,718 | 12/1934 | Wistrand | 82/30 |
| 2,109,766 | 3/1938 | Bullard | 82/30 |
| 2,223,748 | 12/1940 | Thoren | 308/187.1 |
| 3,447,843 | 6/1969 | Shipman | 308/187.1 |
| 3,447,847 | 6/1969 | Stansell et al. | 308/187.1 |

*Primary Examiner*—Harrison L. Hinson
*Attorney, Agent, or Firm*—Fleit & Jacobson

[57] ABSTRACT

In the disclosed assembly, in accordance with the invention, there is provided a means for preventing drawing-in of air into the housing from ambient atmosphere through the labyrinth seal in the rear lid. The means includes a passage having its inlet communicating with the ambient atmosphere and its outlet communicating with the clearance between the spindle flange and the front lid. The disclosed spindle assembly is primarily intended for use in finishing boring machines wherein the tool spindles are of a flange-type design and are mounted in antifriction bearings. The disclosed spindle assembly prolongs the period of high-accuracy performance of the antifriction bearings and their service life in general.

6 Claims, 2 Drawing Figures

SPINDLE ASSEMBLY FOR A PRECISION MACHINE TOOL

The present invention relates to the art of machine tool construction, and, more particularly, it relates to spindle assemblies incorporable in finishing boring machines.

The invention can be utilized to utmost effectiveness in finishing boring machines wherein the spindles are of the flangetype design and are mounted in antifriction bearings.

However, the invention can be likewise utilized in the spindle assemblies of grinding machines, as well as in a variety of other machines and apparatus wherein the spindles are mounted in antifriction bearings which are grease-lubricated, the spindles being rated for rotation at angular speeds in excess of 1000 revolutions per minute.

There is known a spindle assembly for a precision machine tool, such as a finishing boring machine, comprising a housing having a front lid and a rear one, both provided with labyrinth seals of packings. A spindle is mounted within the housing in grease-lubricated antifriction bearings, the spindle having a flange. The flange of the spindle is situated adjacent to the front lid of the housing and is spaced therefrom by a certain clearance or gap. With the spindle rotating, this clearance forms a suction zone, owing to the centrifugal action.

A major disadvantage of the spindle assembly of the aforesaid type is the aspiration phenomenon resulting in air being drawn into the housing through the labyrinth seal in the rear lid of the housing, the air carrying therewith particles that are capable of polluting the grease in the bearing, which results in the initial accuracy of the dimensions and performance of the bearings being either lost or at least noticeably affected, and in untimely wearing away of the bearing in general.

It is the main object of the present invention to create a spindle assembly for a precision machine tool, of which the design should ensure that the period within which the machine tool performs high-accuracy machining is prolonged.

It is another object of the present invention to create a spindle assembly for a precision machine tool, which should offer high precision of machining.

It is yet another object of the present invention to create a spindle assembly for a precision machine tool, which should offer a prolonged service life.

These and other objects are attained in a spindle assembly for a precision machine tool, comprising a housing with a front lid and a rear lid, both being associated with labyrinth seals, a spindle being mounted within the housing in grease-lubricated antifriction bearings, the spindle having a flange situated adjacent to the front lid and being spaced therefrom by a predetermined clearance presenting a suction zone with the spindle rotating in operation. In accordance with the invention, the spindle assembly incorporates means preventing drawing-in of air from the ambient atmosphere, carrying grease polluting particles, into the housing through the labyrinth seal in the rear lid, the means including a passage having its inlet communicating with the ambient atmosphere and its outlet communicating with the said suction zone.

The provision of the passage having its inlet communicating with the ambient atmosphere and its outlet communicating with the suction zone created in operation intermediate the flange of the spindle and the front lid of the housing prevents aspiration of air from the internal space of the housing of the spindle assembly, resulting in a draft within the housing from the rear lid toward the front lid thereof, and, consequently, prevents drawing-in of air with particles capable of polluting the grease through the labyrinth packing or seal in the rear lid of the housing.

It is expedient that the passage should be made in the front lid of the housing.

With the passage being thus made, there is ensured circulation of air outside the housing, creating an air curtain impeding communication of the internal space of the housing with the ambient air.

To completely preclude pollution of the lubricating grease with particles from the ambient air, it is further expedient that the means preventing drawing-in of air should include an additional passage made in the rear lid of the housing and having its inlet communicating with the ambient atmosphere and its outlet communicating with a clearance intermediate the rear lid of the housing and a disc rigidly secured on the spindle adjacent to the rear lid.

With the spindle assembly thus designed, there are created two air curtains adjacent to the front and rear lids, respectively, completely precluding any access of grease-polluting particles into the housing from the ambient atmosphere.

In order to ensure that the centrifugal suction phenomena adjacent to the front and rear lids, respectively, should be of substantially the same magnitude, it is expedient that the diameter of the disc mounted on the spindle adjacent to the rear lid should be substantially equal to the diameter of the flange.

In order that the two air curtains created in operations should be substantially identical, it is further expdient that the clearance defined intermediate the flange of the spindle and the front lid of the housing should be substantially equal to the clearance defined intermediate the disc secured on the spindle and the rear lid of the housing.

Figure 2:
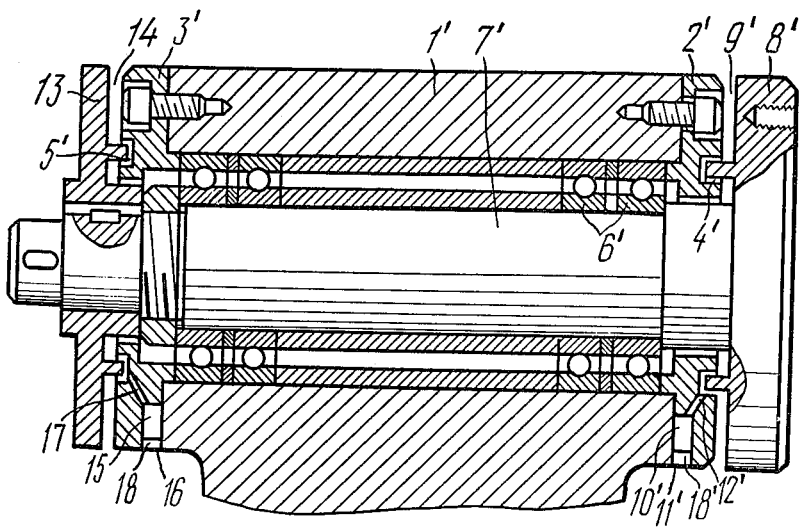

The present invention will be further described in connection with embodiments thereof, with reference being had to the accompanying drawings, wherein:

FIG. 1 is a longitudinal sectional view of a spindle assembly in accordance with the invention, wherein the means preventing drawing-in of air is situated in the front lid of the housing, FIG. 2 is a longitudinal sectional view of a similar spindle assembly embodying the invention, wherein the means for preventing drawing-in of air are situated both in the front and rear lids of the housing.

Referring now to the drawings, the disclosed spindle assembly for a precision machine tool, e.g. a finishing boring machine tool, comprises a housing 1 (FIG. 1) with a front lid 2 and a rear lid 3. In the present disclosure the front lid 2 is the one pertaining to the side of the mounting of the tool, e.g. a boring tool (not shown), whereas the rear one 3 is the one closing the housing 1 from the opposite side.

Both lids 2 and 3 cooperate, in a manner to be hereinafter described to define labyrinth seals 4 and 5, respectively. Mounted inside the housing 1 are antifriction spindle-supporting bearings 6 adapted to be lubricated by grease packed thereinto. Thus, the antifriction bearings 6 have mounted therein a spindle 7 having a flange 8 thereon, situated adjacent to the front lid 2, with an air clearance or gap defined between the end face of the flange 8 and the adjacent surface of the front lid 2. A stop 20 is connected to the spindle 7 adjacent the rear lid 5 in a manner well known to those skilled in the art (See for instance U.S. Pat. No. 3,447,842).

In accordance with the invention, the spindle assembly incorporates means for preventing drawing-in of air with grease-polluting particles from the ambient atmosphere into the housing 1 through the labyrinth seal 5 in the rear lid 3. The means includes a passage 10 having its inlet 11 communicating with the atmosphere and its outlet 12 communicating with the clearance 9 intermediate the flange 8 of the spindle 7 and the front lid 2 of the housing 1.

The passage 10 is made in the front lid 2 of the housing 1. The previously mentioned labyrinth seal 4 is defined by mating projections 21 and depressions 22 formed in the flange 8 and front lid 2, respectively. Similarly, projections 23 of stop 20 and depressions 24 of rear lid 3 define labyrinth seal 5.

To completely preclude any access of grease-polluting particles into the housing, there is illustrated in FIG. 2 another embodiment of the invention, including the means for preventing drawing-in of air. In FIG. 2, the same reference numerals, with primes, have been used to identify components similar to the components of the previously discussed embodiment of FIG. 1. In FIG. 2, a disc 13 is rigidly secured on the spindle 7' for rotation therewith, situated adjacent to the rear lid 3' with a certain clearance or gap 14 left therebetween, and an additional passage 15 made in the rear lid of the housing 1'. The inlet 16 of the passage 15 communicates with the ambient atmosphere, while the outlet 17 thereof communicates with the clearance 14 defined intermediate the rear lid 3' of the housing 1' and the disc 13.

It should be pointed out that in the disclosed embodiment the diameter of the disc 13 substantially equals that of the flange 8', and the size of the clearance or gap 9' substantially equals that of the clearance or gap 14.

Mounted in front of the inlets 11' and 16, respectively, of the passages 10' and 15 are mesh filters 18' adapted to prevent access of large grease-polluting particles into the passages 10 and 15. Similar filters 18 are also provided in the embodiment illustrated in FIG. 1.

The disclosed assembly operates, as follows.

With the machine engaged in operation and the spindle 7 rotating, centrifugal phenomena take place in the air gaps or clearance 9' and 14, creating suction in these clearances. Consequently, replenishing of the air being sucked is effected through the passages 10' and 15 with the respective mesh filters 18' mounted at their inlets 11' and 16.

As a result, there are created adjacent to the front lid 2' and the rear lid air curtains in the form of air streams directed into the ambient atmosphere and opposing the access of air carrying grease-polluting particles, e.g. dust, tiny pieces of shavings, driving belt wear products, etc. from the ambient atmosphere into the housing 1' of the assembly.

Owing to the provision of the passages 10' and 15, respectively, in the lids 2' and 3', with their outlets 12' and 17 communicating with the air gaps 9' and 14 from which the air is drawn out by the centrifugal action, there is precluded the phenomenon of aspiration which in the hitherto known similar structures results in the bearings becoming polluted.

The present invention yields better and more durable retaining of the initial accuracy of the assembly, which accuracy, according to the data obtained by experiments, is four times as good as that of the hitherto known similar structures, the implementation of the invention protecting the high-precision bearings of the spindle assembly of the type described from untimely wear.

What is claimed is:

1. A spindle assembly for a precision machine, comprising: a housing having a front lid and a rear lid; antifriction bearings mounted inside said housing; a spindle mounted for rotation in said antifriction bearings within said housing, said spindle having a flange situated adjacent said front lid of said housing with a clearance left therebetween, said flange interacting with said front lid to define a first labyrinth seal; connecting means attached to said spindle and spaced from said rear lid for determining the relationship between said spindle and said housing, said connecting means interacting with said rear lid to define a second labyrinth seal; control means for controlling the effects of suction created within the clearance defined between said flange and said front lid by the rotation of the spindle, said control means preventing drawing-in of air from the ambient atmosphere into said housing through said second labyrinth seal, said control means including a passage, said passage having an inlet communicating with the ambient atmosphere, said passage further having an outlet communicating with said first labyrinth seal.

2. A spindle assembly as set forth in claim 1, wherein said passage is made in said front lid of said housing.

3. A spindle assembly as set forth in claim 2, wherein said connecting means includes a disc rigidly secured to said spindle in spaced relationship to said rear lid to define a gap between the disc and the rear lid and wherein said control means includes an additional passage made in said rear lid of said housing, said additional passage having an inlet communicating with the ambient atmosphere and an outlet communicating with said gap.

4. A spindle assembly as set forth in claim 3, wherein the diameter of said flange is substantially equal to said diameter of the disc.

5. A spindle assembly as set forth in claim 3, wherein the size of said clearance defined between said flange of said spindle and said front lid of said housing is substantially equal to the size of said gap.

6. A spindle assembly as set forth in claim 1, wherein mesh filter means are provided at said inlet of said passage.

* * * * *